US006852377B2

(12) United States Patent
Böhm et al.

(10) Patent No.: US 6,852,377 B2
(45) Date of Patent: Feb. 8, 2005

(54) SURFACE PROTECTION FILM FOR FRESHLY PAINTED AUTOMOBILE SURFACES WITH A MULTICOMPONENT ADHESIVE

(75) Inventors: Nicolai Böhm, Hamburg (DE); Jobst-Waldemar Klemp, Schenefeld (DE); Thorsten Krawinkel, Hamburg (DE); Bernd Lühmann, Hamburg (DE)

(73) Assignee: tesa AG, Hamburg (DE)

( * ) Notice: Subject to any disclaimer, the term of this patent is extended or adjusted under 35 U.S.C. 154(b) by 0 days.

(21) Appl. No.: 10/398,003

(22) PCT Filed: Oct. 9, 2001

(86) PCT No.: PCT/EP01/11676

§ 371 (c)(1),
(2), (4) Date: May 21, 2003

(87) PCT Pub. No.: WO02/31074

PCT Pub. Date: Apr. 18, 2002

(65) Prior Publication Data

US 2003/0190465 A1 Oct. 9, 2003

(30) Foreign Application Priority Data

Oct. 12, 2000 (DE) .......................... 100 50 449
Nov. 29, 2000 (DE) .......................... 100 59 360

(51) Int. Cl.[7] ......................... B32B 27/18; B32B 27/30; B32B 27/32; B32B 31/30
(52) U.S. Cl. ......................... 428/31; 428/337; 428/353; 428/355 EN; 428/516; 428/520; 428/522; 428/523; 156/244.11; 156/332; 264/176.1
(58) Field of Search .......................... 428/31, 337, 353, 428/355 EN, 516, 520, 52, 523; 156/244.11, 332; 264/176.1; 525/222, 228

(56) References Cited

U.S. PATENT DOCUMENTS

| 5,601,917 | A | | 2/1997 | Matsui et al. ............... 428/356 |
| 5,612,136 | A | | 3/1997 | Everaerts et al. ........... 428/355 |
| 5,895,714 | A | | 4/1999 | Malek ........................ 428/337 |
| 5,925,456 | A | * | 7/1999 | Malek ........................ 428/332 |

FOREIGN PATENT DOCUMENTS

| DE | 195 32 220 | 3/1997 |
| DE | 195 32 220 A1 | 3/1997 |
| DE | 196 35 704 | 3/1998 |
| DE | 197 42 805 A1 | 4/1999 |
| EP | 0 519 278 A2 | 12/1992 |
| EP | 0761315 A | 3/1997 |
| EP | 0 763 584 A1 | 3/1997 |
| EP | 0 826 754 A | 3/1998 |
| JP | 802 7444 | 1/1996 |
| JP | 916 5559 | 6/1997 |
| WO | WO 96/37568 | 11/1996 |

* cited by examiner

*Primary Examiner*—Ramsey Zacharia
(74) *Attorney, Agent, or Firm*—Norris McLaughlin & Marcus PA

(57) ABSTRACT

Self-adhesive protective film for freshly painted automobiles, comprising a backing layer and a self-adhesive layer comprising a three-component mixture of vinyl acetate copolymers.

12 Claims, No Drawings

SURFACE PROTECTION FILM FOR FRESHLY PAINTED AUTOMOBILE SURFACES WITH A MULTICOMPONENT ADHESIVE

The invention relates to a protective film which rapidly achieves a high level of adhesion to fresh motor vehicle finishes but nevertheless can be removed again without great force after long bonding times and which for that reason is outstandingly suitable for the transit protection of new vehicles in order to protect the sensitive paint surfaces against soiling and damage.

The preservation and protection of motor vehicles in transit from manufacturer to dealer has long been common practice.

The conventional method of preserving automobiles involves applying paraffin waxes involves in a thickness of from 5 to 20 μm. However, it has been found that, especially on horizontal areas of the vehicles, such as hood, roof, and trunk lid, such a thin and usually nonuniform coat does not afford adequate protection against external influences, such as the corrosive effect of bird droppings, for example.

A considerable disadvantage of sealing with paraffin wax is the need to remove the preservative using a steam jet, surfactants or solvents. Environmentally sound recovery and disposal of the residues entail considerable deployment of apparatus and also very high costs.

A current development in the field of automobile transit protection is the use of covers which go over the entire vehicle and are shrunk on to fit by exposure to heat.

Cover solutions of this kind are very costly and involve a great deal of effort in applying the cover, effecting shrinkage, and especially for entry to the masked vehicle. For that particular purpose, zipper openings are provided, whose necessary opening and reclosing is time-consuming. Visibility when maneuvering is severely impaired, and enclosed dirt and unavoidable scuffing result in scratches on the paint in certain areas. This solution has not so far become established.

In recent years, instead, increased use has been made of self-adhesive surface protective films which are applied temporarily. They are specifically intended for the transit protection of fresh motor vehicles, have a much better protective effect than the waxes against mechanical and chemical influences, and have the advantage over the covers of being more favorably priced and much quicker to apply.

Key requirements imposed on a surface protective film are:

Good protective effect for the paint against chemical and mechanical influences.

Weathering stability over the entire period of the transport chain from plant to dealer, which depending on distance may amount to several months. Thus a film of this kind must be removable in one piece even after long, intense sunlight exposure and must not leave any residues of adhesive on the paint.

Sufficient initial tack, so as not to detach prematurely of itself in difficult bonding geometries.

Balanced final bond strength, so that the film on the one hand adheres securely (even with a strong slipstream or rain) but on the other hand can be removed without great force or even tearing. Ideally, the desired bond strength would be present from the start. In practice, however, the adhesion is weaker to start with and then increases over time and particularly under the effect of temperature. This is referred to in the language of the art as "peel increase".

Paint compatibility, which means that following removal of the adhesive tape the paint surface must not exhibit any deterioration whatsoever in the form of deposits or deformations. Deformations are impressions in the paint which are manifested on the one hand as contours of film edge, air bubbles included in the bond, and folds, and on the other hand as dulling under the entire area of bonding.

In accordance with the prior art, film materials used are generally polyolefins or mixtures thereof which are commonly blended with light stabilizers and titanium dioxide.

A diversity of systems are used as self-adhesive compositions, but without exception are hampered by weaknesses.

Self-adhesive compositions based on natural rubber possess relatively good initial adhesion, and can be removed again without residue. Even on short-term exposure to UV radiation, however, these compositions are not stable to aging. Following realistic weathering exposures over a period of several months, this leads to severe greasy residues or hardened paintlike residues on the finish.

U.S. Pat. No. 5,612,136 mentions a protective film having an acrylate-based self-adhesive composition. Polyacrylate compositions are indeed highly UV-stable. If, however, uncrosslinked polyacrylate compositions are stored under alternating climatic conditions, their compatibility with paint surfaces is good only in some cases. Moreover, polyacrylate compositions exhibit an undesirable extent of peel increase, i.e., the removal of the film after some time requires great force. Where these compositions are strongly crosslinked chemically or by radiation, they are indeed easier to remove but on the other hand cause increased incidence of clearly visible, permanent deformations of the paint surface.

Self-adhesive compositions based on polyisobutylene (polyisobutylene homopolymer or butyl rubber) exhibit little adhesion to finishes customary in the automobile industry following storage under alternating climatic conditions. Under jerky stresses, such as on flapping in the slipstream, the adhesion is so low that the bond strength required in practice is not always present to a sufficient extent. Under the influence of moisture, in particular, the adhesion is often reduced to such an extent that the film detaches from the protected vehicles in transit, resulting firstly in a loss of protection and secondly in a safety risk if the film drifts uncontrolledly onto the windshield of following vehicles.

Moreover, this self-adhesive composition is incompatible with the sealing profiles that are customary in automobile construction, or with the plasticizers they contain: when the protective film is removed from window profiles, residues of the adhesive remain on the rubber. Adhesive articles of this kind are described in EP 0 519 278 A1, JP 95-325285, and U.S. Pat. No. 5,601,917.

Substantially more UV-stable than polyisobutylenes are adhesives comprising hydrogenated styrene/diene block copolymers, whose application is described in JP 08 027 444. A major disadvantage of such block copolymers is their thermally reversible crosslinking by way of the styrene domains. Heating, which is normal in summertime, of the automobile covered by an adhesive film always leads to shrinkage of the protective film, and the warmed, soft adhesive therefore leaves residues on the receding edges of the adhesive film on the metal panel. These systems also unfavorably affect the paint surface.

WO 96/37568 describes the use of polyhexene and, respectively, polyoctene for a nonpolar pressure-sensitive adhesive (PSA). Although the peel increase of the polymers described in the examples is low, owing to the low cohesion, the low molecular weight of commercial polymers of this kind nevertheless means that these polymers, too, lead to residues, which it is attempted to avoid by adding other polymers, referred to therein as "cold flow restricting agents". For practical purposes, nevertheless, these adhesives lack adequate cohesion, which leads to residues after weathering, especially if the adhesive tape shrinks on exposure to heat.

A similar phenomenon is displayed by ethylene-propylene-diene copolymers (EPDM), as specified in DE 197 42 805 A1. Furthermore, they exhibit a very limited initial adhesion.

The adhesive film described in DE 195 32 220 A1, comprising polyethylene vinyl acetate (EVAc) adhesive, is markedly superior in adhesion properties to the systems described above.

This system achieves good bonding values after just a short time and ensures a high level of bonding security against unwanted voluntary detachment during transit. On the other hand, the bond strength becomes a disadvantage in the context of removal after use, since the force expended, as in the case of polyacrylate compositions, is much too high, as a result of which the adhesive film can in many cases not be removed without tearing. The influencing of the paints to be protected is generally low. The UV stability is particularly noteworthy.

Good initial adhesion, high bonding security, absence of residues on removal, paint compatibility, and prevention of excessive peel increase cannot be achieved with customary methods of bond strength reduction in the case of pressure-sensitive adhesives—for example, the addition of fillers—without an accompanying deterioration in paint compatibility. Fillers in the pressure-sensitive adhesive lead to areas of dulling in this application as a result of the particles being reproduced in the smooth paint surface, particularly under the influence of heat.

It is an object of the invention to retain the advantages of the EVAc adhesive system, namely good initial adhesion, high bonding security, absence of residues on removal, and paint compatibility, and to find a possible way of being able to control the substantial disadvantage of excessive peel increase without adversely affecting the strengths, so as to provide, as a result, a surface protective film particularly for the in-transit protection of brand new automobiles.

This object is achieved by a self-adhesive protective film as specified in the main claim. The dependent claims relate to advantageous developments of the self-adhesive protective film, to particular application possibilities, and to a particularly advantageous process for producing the surface protective film.

Surprisingly and unexpectedly, a three-component mixture of vinyl acetate copolymers exhibits a continuous and precise control of the detachment forces for the adhesive coating, depending on the proportion of the three components, in combination with a high initial bond strength and good paint compatibility.

Analogous two-component mixtures or the substances alone do not display this combination of properties.

The vinyl acetate copolymers may differ in their comonomers, their molar mass, and their comonomer ratio.

The invention accordingly provides a surface protective film comprising a backing layer, in particular a polyolefinic backing layer, bearing a pressure-sensitive adhesive comprising 100 parts of a component A comprising a vinyl acetate copolymer or a mixture of two or more vinyl acetate copolymers of, for example, different molecular weight, having a vinyl acetate content of from 60 to 75% by weight and a maximum of the loss factor tan $\delta$, measured by means of DMTA and determined at an angular frequency $\omega$=1 rad/s, of <0° C., from 5 to 80 parts of a component B comprising a vinyl acetate copolymer or a mixture of two or more vinyl acetate copolymers of different molecular weight, having a vinyl acetate content of from 75 to 95% by weight and a maximum of the loss factor tan $\delta$, measured by means of DMTA and determined at an angular frequency $\omega$=1 rad/s, of $\geq$-5° C., and from 5 to 80 parts of a component C comprising a vinyl acetate copolymer or a mixture of two or more vinyl acetate copolymers of different molecular weight, having a vinyl acetate content of $\leq$70% by weight, which at the same time has a vinyl acetate content of at least 5% by weight below the vinyl acetate content of component A.

In a first advantageous embodiment components A, B, and C are copolymers based on ethylene and/or propylene and/or further $\alpha$-olefins and vinyl acetate.

In another advantageous embodiment components A and B are copolymers based on ethylene and vinyl acetate and component C is a copolymer based on ethylene and/or propylene and/or further $\alpha$-olefins and vinyl acetate.

In a further advantageous embodiment components A, B, and C comprise ethylene vinyl acetate copolymers.

Suitable comonomers for the vinyl acetate include in particular ethylene, propylene, and higher $\alpha$-olefins and also mixtures of these, but also vinylpyrrolidone. Suitable blend components include plasticizers such as polyethers of different molar mass, in order to tailor the viscoelastic properties to the specific application.

The properties of such polymers can be quantified readily with the aid of a Theological measurement in the dynamic (oscillating) measurement mode of a rheometer. In this case the polymer sample, which is located between two plane-parallel plates, is deformed sinusoidally with a circular frequency $\omega$ in such a way that the range of the linear viscoelasticity is not left. The sample transmits the stimulating oscillation of the motor with a shift in phase $\delta$ and with reduced amplitude to the force transducer of the rheometer. The result is a complex shear modulus G* whose real component reflects the elastic component (storage modulus G') and whose imaginary component reflects the viscous component (loss modulus G"). The quotient formed from these two variables is tan $\delta$.

$$\tan \delta = G''/G'$$

If the temperature is varied, tan $\delta$ is obtained as a function of temperature (dynamic mechanical thermoanalysis, DMTA). If a wide temperature range is swept which includes the glass transition temperature, this dynamic glass transition, which in many cases is not the same as the glass transition temperature determined from the DSC, can be detected as a maximum of tan $\delta$. The dynamic glass transition temperature is generally also a function of the stimulating circular frequency, and so said frequency must be reported as well.

The self-adhesive compositions described can be applied from solution onto a backing sheet or produced by coextrusion simultaneously with the backing layer and further, auxiliary layers.

Preferably, the backing layer of the adhesive that is used is a thermoplastic polyolefin sheet which is unoriented and includes at least one polyolefin from the group of the polyethylenes (for example, HDPE, LDPE, MDPE, LLDPE, VLLDPE, copolymers of ethylene with polar comonomers) and from the group of the polypropylenes (for example, polypropylene homopolymers, random polypropylene copolymers or block polypropylene copolymers).

It is preferred to use mixtures of different suitable polyolefins, in order to allow optimum setting of the mechanical and thermal properties and also gloss, extrusion properties, anchoring of the adhesive, etc.

A thickness of from 20 to 80 µm is preferred for the backing sheets, including where appropriate an adhesion promoter layer disposed between the backing layer and the adhesive layer.

During the application of the protective film, the softness of the backing sheet has a part to play in connection with the deformability; the force at 10% elongation should not exceed 25 N/15 mm, preferably 16 N/15 mm, in either the lengthwise or transverse direction (tensile test in accordance with DIN EN ISO 527-7-5). For this reason the backing sheets should be unoriented. Drawing raises the force at 10% elongation so greatly that conformability is no longer assured.

In order to give the backing sheet the required weathering stability, the addition of light stabilizers is preferable. Their function consists primarily in preventing the embrittlement of the backing sheet. Light stabilizers of this kind are described in Gaechter and Müller, Taschenbuch der Kunststoff-Additive, Munich 1979; in Kirk-Othmer (3rd) 23, 615–627; in Encycl. Polym. Sci. Technol. 14, 125–148; and in Ullmann (4th) 8, 21; 15, 529, 676. Hindered amine light stabilizers (HALS), in particular, are suitable for the protective film of the invention. The amount of light stabilizer ought to be at least 0.15% by weight, preferably at least 0.30% by weight, based on the backing sheet.

The use of antioxidants for the sheet (for example, Irganox 1010 or trisnonylphenyl phosphite) is advantageous though not absolutely necessary. Further suitable UV absorbers, light stabilizers, and aging inhibitors are set out in EP 0 763 584.

An additional improvement in the light stability of the backing sheet is also possible through the addition of titanium dioxide. Of advantage in respect of the mechanical properties and the homogeneity of the whiteness are from 5 to 15% by weight additions of titanium dioxide.

The UV permeability of the protective film in the region from 290 to 360 nm is preferably less than about 1%, more preferably less than about 0.1%, owing to the interaction of light stabilizers and pigments.

The protective films thus produced exhibit very firm adhesion to a variety of finishes common in the automobile industry, even under the influence of moisture or humid conditions, so that the protective film does not detach from the vehicle even under wind exposure or under tension caused by bonding to curved surfaces. Moreover, the self-adhesive composition exhibits sufficient bond strength especially within the first few minutes following application, so that after just half an hour the protective film may be exposed, for example, to a severe slipstream load (up to 160 km/h). The adhesive film of the invention, unlike the EVAc adhesives which have hitherto been customary in the art, can be removed from the paint without undue force.

The peel force of the protective film of the invention on paint is generally more than about 0.8 in the fresh state and less than about 3.0 N/cm following storage under alternating climatic conditions, in accordance with the measuring conditions explained in the examples. Even exposure of the protective film to UV light in accordance with DIN 53387 1-A-X over 1000 hours does not cause any deficiencies in the properties of the protective film; there is no embrittlement of the film and there are no residues of adhesive on removal.

The protective film of the invention is therefore particularly suitable for assembly or transit protection of the fresh finish of automobiles or as processing and transit protection for freshly painted surfaces. The protective film may be bonded just half an hour after the painted surfaces have passed through the oven, without any disadvantages whatsoever, despite the fact that at this point in time the paint is not yet fully cured.

A further feature of the protective film of the invention is that it can be applied in a large width over the hood, roof, and trunk of automobiles and that, owing to its deformability, it conforms very well to planar and even gently curved surfaces. It is therefore possible to protect the horizontal surfaces which are most at risk from soiling. However, even narrow areas such as, for example, the projection of the door beneath the windows, the entry area or bumpers can easily be covered. Protection of the vertical surfaces on the vehicle is particularly appropriate during its assembly.

The protective film is resistant to sunlight, moisture, heat, and cold, with weathering stability of at least six months. Even very high sun levels, as are encountered in Florida, for example, do not cause the protective film to fail or detach. The extremely low UV permeability of the protective film supports the adhesive's resistance to sun exposure.

Furthermore, the strength of the protective film in comparison to preservation with wax ensures impeccable protection against soiling such as bird droppings and against damage to the vehicle as a whole by minor mechanical events. It is possible to recycle the protective film or recover energy from it, in particular since it is halogen-free.

In the text below, the invention will be illustrated on the basis of examples which are not, however, intended to restrict the invention.

EXAMPLES

All of the example films were produced by coating a corona-pretreated polyolefin backing with the toluenic solutions of the individual adhesive formulas. The backing was 60 µm thick and its composition was as follows:

60 parts polypropylene block copolymer Daplen FFC 2012 (PCD)

25 parts polypropylene homopolymer Daplen KFC 201 (PCD)

6.3 parts LDPE Lupolen 1840 H (Elenac)

8.4 parts titanium dioxide 0.3 parts UV light stabilizer Tinuvin 770 (Ciba-Geigy)

The thickness of the applied layer of pressure-sensitive adhesive after drying was in each case 25 µm, so that the specimens had an overall thickness of 85 µm.

In the upper part of Table 1, exemplary formulas are set out in accordance with the claims and counterexamples.

The specimens were bonded in strips to specimen metal panels coated with a one-component PU material (Duraclear II, BASF). The specimens were assessed in accordance with the following criteria:

1. Peel force from paint after 30 minutes at room temperature
2. Peel force from paint after storage at 90° C. for three days
3. Overall performance judgment Determination of the Assessment Criteria Peel force from paint after 30 minutes at room temperature and peel force from paint after storage at 90° C. for three days The bond strengths were measured at a peel angle of 180°, a peel speed of 20 m/min, a temperature of 23° C.±1° C., and a relative humidity of 50%±5%.

Overall Performance Judgment

The overall performance judgment expresses a recommendation as to whether the film provides overall satisfaction of the performance properties of high initial bond strength, moderate final bond strength, and good paint compatibility.

The results are summarized in the bottom part of Table 1.

TABLE 1

PSA compositions of the examples and the peel forces from paint after different storage conditions.

| Comp. | | 1 | 2 | 3 | 4 | 5 | 6 | 7 | 8 | 9 | 10 | 11 | 12 |
|---|---|---|---|---|---|---|---|---|---|---|---|---|---|
| Specimen formulas (parts) | | | | | | | | | | | | | |
| | Levapren 500[1] | 100 | 100 | | | | | | | | | | |
| | Levapren 600[1] | | | 100 | 100 | 100 | 100 | | | | | | |
| A | Levapren 700[1] | | | | | | | 100 | 100 | 100 | 100 | 100 | 70 |
| A | Baymod 2418[2] | | | | | | | | | | | | 30 |
| B | Levapren 800[1] | | 20 | | 20 | | | | 20 | | | 30 | 20 |
| B | Vinnapas L 8688[3] | | | | | 20 | | | | 20 | | | |
| C | Levapren 450[1] | | | | | | 30 | | 30 | 30 | 30 | 30 | 30 |
| Peel forces from paint (N/cm) | | | | | | | | | | | | | |
| | Peel force fresh[4] | 1.0 | 0.8 | 1.3 | 1.3 | 1.2 | 0.8 | 1.5 | 1.4 | 1.0 | 12 | 0.9 | 1.3 |
| | Peel force final[5] | 3.7 | 3.9 | 4.2 | 4.0 | 4.1 | 4.2 | 4.5 | 4.4 | 2.6 | 2.8 | 1.9 | 2.9 |
| | Overall judgement | Unst | Unst | Unst | Unst | Unst | Unst | Unst | Unst | sat | sat | sat | sat |

Abbreviations: sat = satisfactory, unst = unsatisfactory
[1]Polyethylene-vinyl acetate, manufacturer Bayer. Vinyl acetate content corresponds to the number divided by 10 in % by weight.
[2]Polyethylene-vinyl acetate, manufacturer Bayer. Vinyl acetate content 68% by weight.
[3]Terpolymer of vinyl acetate, ethylene, and propylene, manufacturer Air Products. Vinyl acetate content 80% by weight.
[4]Peel force from paint after 30-min bonding time at room temperature.
[5]Peel force from paint after 3-day bonding time at 90° C.

Discussion

All of the examples display good initial adhesion after storage at room temperature for 30 minutes, with "good" in practical tests being classified as about ≧0.8 N/cm. Distinct differences are evident in the final adhesion values established after 3 days of storage at 90° C.

It is found that only the three-component mixtures achieve a significant reduction in the adhesion levels: All one-component and two-component PSAs are well above 3 N/cm in final adhesion, which is generally perceived in the art to involve excessive application of force when redetaching the protective film from the motor vehicle paint. The continuous controllability of the final adhesion through component B, without the initial adhesion becoming unacceptably low, is evident in specimens 8, 9 and 11.

Overall, specimens 1 to 8 are classified as unsatisfactory in performance terms and specimens 9 to 12 are classified as satisfactory in performance terms.

Since the bond strengths are different on different paints, the possibility is opened up in this way of setting a suitable tailor-made bond-strength profile for different substrates.

What is claimed is:

1. A self-adhesive protective film for the surface protection of painted vehicles or vehicle parts, comprising a single-ply or multi-ply backing layer and a self-adhesive layer, wherein the self-adhesive composition comprises 100 parts by weight of a component A comprising a vinyl acetate copolymer or a mixture of two or more vinyl acetate copolymers having a vinyl acetate content of from 60 to 75% by weight and a maximum of the loss factor tan δ, measured by means of DMTA and determined at an angular frequency $\omega=1$ rad/s, of <0° C., from 5 to 80 parts by weight of a component B comprising a vinyl acetate copolymer or a mixture of two or more vinyl acetate copolymers of different molecular weight, having a vinyl acetate content of from 75 to 95% by weight and a maximum of the loss factor tan δ, measured by means of DMTA and determined at an angular frequency $\omega=1$ rad/s, of $\geqq -5°$ C., and from 5 to 80 parts by weight of a component C comprising a vinyl acetate copolymer or a mixture of two or more vinyl acetate copolymers of different molecular weight, having a vinyl acetate content of ≦70% by weight, which at the same time has a vinyl acetate content of at least 5% by weight below the vinyl acetate content of component A.

2. The self-adhesive protective film of claim 1, wherein components A, B, and C are copolymers based on ethylene and/or propylene and/or further α-olefins and vinyl acetate.

3. The self-adhesive protective film of claim 1, wherein components A and B are copolymers based on ethylene and vinyl acetate and component C is a copolymer based on ethylene and/or propylene and/or further α-olefins and vinyl acetate.

4. The self-adhesive protective film of claim 1, wherein components A, B, and C comprise ethylene vinyl acetate copolymers.

5. The self-adhesive protective film claim 1, wherein the thickness of the backing layer is between 20 and 80 μm, optionally including an adhesion promoter layer disposed between the backing layer and the adhesive layer.

6. The self-adhesive protective film of claim 1, wherein the backing layer comprises at least one light stabilizer in an amount of at least 0.15% by weight.

7. The self-adhesive protective film of claim 1, wherein the UV permeability of the protective film in the wavelength range from 290 to 360 nm is below 1%.

8. A process for producing the self-adhesive protective film of claim 1 which comprises simultaneously coextruding the adhesive layer, backing layer, and optionally further auxiliary layers.

9. A method of protecting freshly painted surfaces of automobiles or automobile parts during assembly or transit, which comprises applying a self-adhesive protective film according to claim 1 to said freshly painted surfaces.

10. A method of protecting sensitive paint, metal, plastic or glass surfaces, which comprises applying a self-adhesive protective film according to claim 1 to said surfaces.

11. The self-adhesive protective film of claim 1, wherein said two or more vinyl acetate copolymers of component A have different molecular weights.

12. The self-adhesive protective film of claim 1, wherein said backing layer is a polyolefinic backing layer.

* * * * *

UNITED STATES PATENT AND TRADEMARK OFFICE
CERTIFICATE OF CORRECTION

PATENT NO. : 6,852,377 B2  Page 1 of 1
APPLICATION NO. : 10/398003
DATED : February 8, 2005
INVENTOR(S) : Böhm et al.

It is certified that error appears in the above-identified patent and that said Letters Patent is hereby corrected as shown below:

Column 4, line 12, "$\geqq -5°C.,$" should read -- $\geq -5°C.,$ --

Column 4, line 16, "$\leqq 70\%$" should read -- $\leq 70\%$ --

Column 7, line 46, "$\geqq 0.8$" should read -- $\geq 0.8$ --

Column 8, line 44, "$\geqq -5°C.,$" should read -- $\geq -5°C.,$ --

Column 8, line 49, "$\leqq 70\%$" should read -- $\leq 70\%$ --

Signed and Sealed this

Twenty-ninth Day of June, 2010

David J. Kappos
*Director of the United States Patent and Trademark Office*